United States Patent [19]

Blaseck

[11] Patent Number: 4,593,939
[45] Date of Patent: Jun. 10, 1986

[54] ARRANGEMENT FOR INTERCONNECTING CONDUITS

[75] Inventor: Klaus Blaseck, Burgdorf, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 510,191

[22] Filed: Jul. 1, 1983

[30] Foreign Application Priority Data

Jul. 14, 1982 [DE] Fed. Rep. of Germany ....... 3226270

[51] Int. Cl.⁴ .............................................. F16L 39/00
[52] U.S. Cl. .................. 285/137.1; 285/126; 285/124; 285/39; 285/157; 285/910
[58] Field of Search ................... 285/137 R, 124, 125, 285/126, 39, 157, DIG. 21, DIG. 11

[56] References Cited

U.S. PATENT DOCUMENTS 479,886  8/1892  Suydam ............................... 285/157
1,565,304 12/1925 Bell ..................................... 285/124 X

FOREIGN PATENT DOCUMENTS 1030679  5/1966  United Kingdom .

*Primary Examiner*—Richard J. Scanlan, Jr.
*Attorney, Agent, or Firm*—Walter Ottesen

[57] ABSTRACT

The invention is directed to an arrangement for interconnecting a first plurality of conduits with a second plurality of conduits such as conduits of the kind utilized in nuclear facilities. Maintenance work in large-area hot cells subjected to radioactivity is conducted with remotely-controlled apparatus that is movable within the hot cell. The conduits must be disconnected and connected again with remotely-controlled apparatus. The connection should be completed quickly and effectively. For this purpose, conduit end portions of the conduits which are to be connected are arranged on a fixed supporting bracket. The two sets of conduit end portions which are to be interconnected curve continuously away from the bracket to define an angle of ninety degrees so that the open terminations of the one set of conduits are spaced from the open terminations of the other set of conduits and the axes of the conduit end portions are mutually parallel. A separate connecting block has a plurality of substantially U-shaped conduit segments cast in place therein so as to be one parallel and adjacent to the other. The open terminations of the U-shaped conduit segments of the connecting block face the open terminations of the curved conduit end portions. The connecting block can be drawn tightly to the curved conduit end portions by suitable holding means.

10 Claims, 7 Drawing Figures

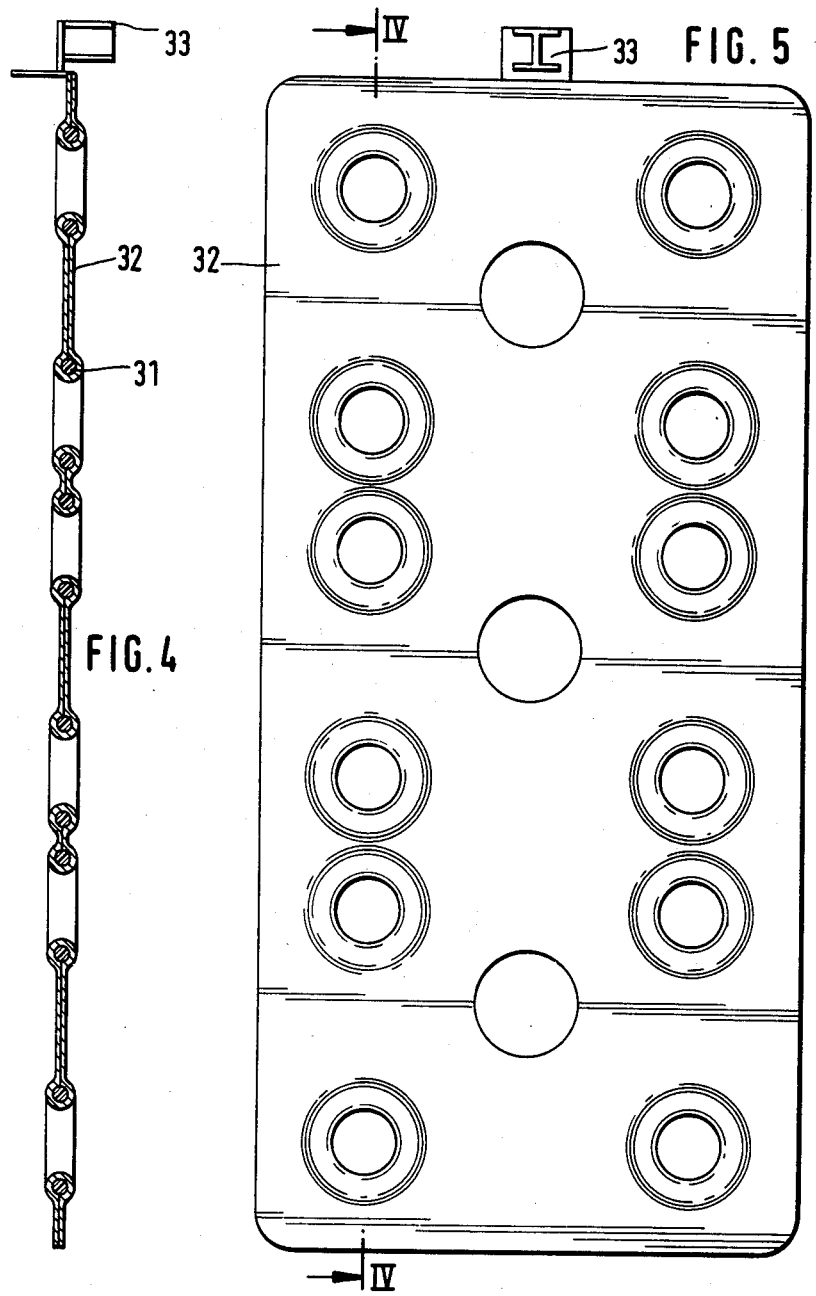

ARRANGEMENT FOR INTERCONNECTING CONDUITS

FIELD OF THE INVENTION

This invention is directed to an arrangement for interconnecting a first plurality of tubular conduits with a second plurality of tubular conduits such as conduits of the kind utilized in nuclear facilities.

BACKGROUND OF THE INVENTION

Facilities for reprocessing irradiated nuclear fuels are provided with so-called hot cells for housing the process equipment used. In these radiation-shielded large-area cells, the process equipment is accommodated in frames known as racks.

The maintenance work within the large-area cells subjected to radiation must be effected without the necessity of having operating personnel enter the cells. The maintenance work is therefore performed by using remotely-controlled apparatus. In this connection, it is preferable that the racks within which the process equipment is contained be lined up in modular format along the longitudinal walls of the hot cell. This makes it possible to completely exchange a rack.

With such an exchange, all tubular conduits which connect two completely loaded racks to each other must be disconnected by remotely-controlled apparatus and, after the new rack is put in place, the tubular conduits must again be connected with each other.

The removal of the rack has up to now been complicated because the ends of the tubular conduits have been directly next to each other and have bounded the location where movement of the racks must necessarily take place when the same are exchanged.

SUMMARY OF THE INVENTION

It is the object of the invention to provide an arrangement for interconnecting conduits by means of which a first plurality of conduits can be connected with or disconnected from a second plurality of conduits quickly and with certainty.

The arrangement of the invention interconnects a first plurality of tubular conduits with a second plurality of tubular conduits such as conduits of the kind utilized in nuclear facilities. The arrangement includes a fixed supporting bracket having receiving means for receiving the respective conduit end portions of the first plurality of conduits and the respective conduit end portions of the second plurality of conduits. The first and second pluralities of conduit end portions curve away from the support bracket ninety degrees so as to cause the open terminations of the first plurality of conduits to be adjacent to and spaced from corresponding ones of the open terminations of the second plurality of conduits and so as to cause the conduit axes of the conduits at the open terminations to be parallel to each other.

The arrangement further includes a connecting block having a plurality of mutually parallel U-shaped conduit segments contained therein, the open terminations of each of the conduit segments being spaced apart so as to cause the conduit segments to connect respective ones of the first plurality of conduit end portions with corresponding ones of the second plurality of conduit end portions when the block is placed in a predetermined position with respect to the fixed supporting bracket. Holding means tightly hold the block to the supporting bracket in the predetermined position.

With the arrangement of the invention described above, a plurality of conduits can be connected or disconnected simultaneously. The block has a plurality of arcuate conduit segments cast therein which permit several conduits to be bridged and joined or, by removing the block, the several conduits can be disconnected.

The arrangement of the invention provides needed lateral free space to permit movement of the racks during the installation and exchange thereof because, with the invention, the first plurality of conduits which are to be connected to the second plurality of conduits are spaced therefrom. Stated otherwise, when the block is removed, the open terminations of the first set of conduits are spaced a predetermined distance away from the open terminations of the second set of conduits.

The arrangement of the invention is especially well adapted for use with remotely-controlled apparatus because it utilizes holding means which is easily accessible with the remotely-controlled apparatus from the interior of the hot cell. This is in contrast to conventional conduit connection arrangements which do not include such connecting means as the block.

The holding means can be a plurality of tension bolts extending through respective bores in the block and connected to the fixed supporting bracket. The heads of the bolts lie against the block to hold the same tightly to the bracket in the predetermined position thereof.

The supporting bracket can also be provided with a plurality of bores so as to be axially aligned with corresponding ones of the bores in the block when the latter is in its predetermined position. The bolts then also extend through corresponding ones of the bores in the bracket. A plurality of nuts threadably engage respective ones of the bolts at the far side of the bracket and means are provided for preventing the rotation of the nuts when the bolts are tightened. The bolts are directed to the interior of the hot cell and are easily accessible and servicable by remotely-controlled apparatus.

In a further embodiment of the invention, the fixed supporting bracket includes a base plate having receiving means. The receiving means includes a first plurality of slots for accommodating respective ones of the first plurality of curved conduit end portions and a second plurality of slots for accommodating respective ones of the second plurality of curved conduit end portions.

The respective open terminations of the first plurality of conduit end portions are to be connected to corresponding ones of the open terminations of the second plurality of conduit end portions. Accordingly, the first plurality of slots are arranged adjacent the second plurality of slots. The slots are arranged in the base plate so that the open end terminations will correspond in their spatial arrangement to the curved conduit segments which are cast in the block. The alignment of the open end terminations at the respective ends of the conduits and the open end terminations in the block is easily effected.

The curved conduit segments in the block and the slots in the base plate are arranged in a predetermined pattern. By using such a patterned arrangement, a simplification of the maintenance work and a reduction of various components is made possible. The block is always provided with a predetermined number of curved conduit segments. If a lesser number of curved conduit segments is required at a particular connecting location, the remaining conduit segments of the block merely remain unused.

According to another feature of the invention, plate-like sealing means is provided which includes a plurality of elastic sealing rings arranged in a predetermined pattern corresponding to respective ones of the open terminations of the conduit segments. This sealing means and the elastic sealing rings thereof constitute an advantageous configuration for sealing of the tubular conduit connections between the curved conduit end portions and the conduit segments of the block.

With the arrangement of the invention, it is possible to connect and disconnect several tubular conduits simultaneously whereby a free space between the ends of respective sets of conduits is obtained.

BRIEF DESCRIPTION OF THE DRAWING

The invention will now be explained with reference to the drawing wherein:

FIG. 4 is a section view of a sealing plate for the arrangement of the invention taken along line V—V of FIG. 5;

FIG. 5 is a plan view of the sealing plate;

DESCRIPTION OF THE PREFERRED EMBODIMENTS OF THE INVENTION

Figure 1:
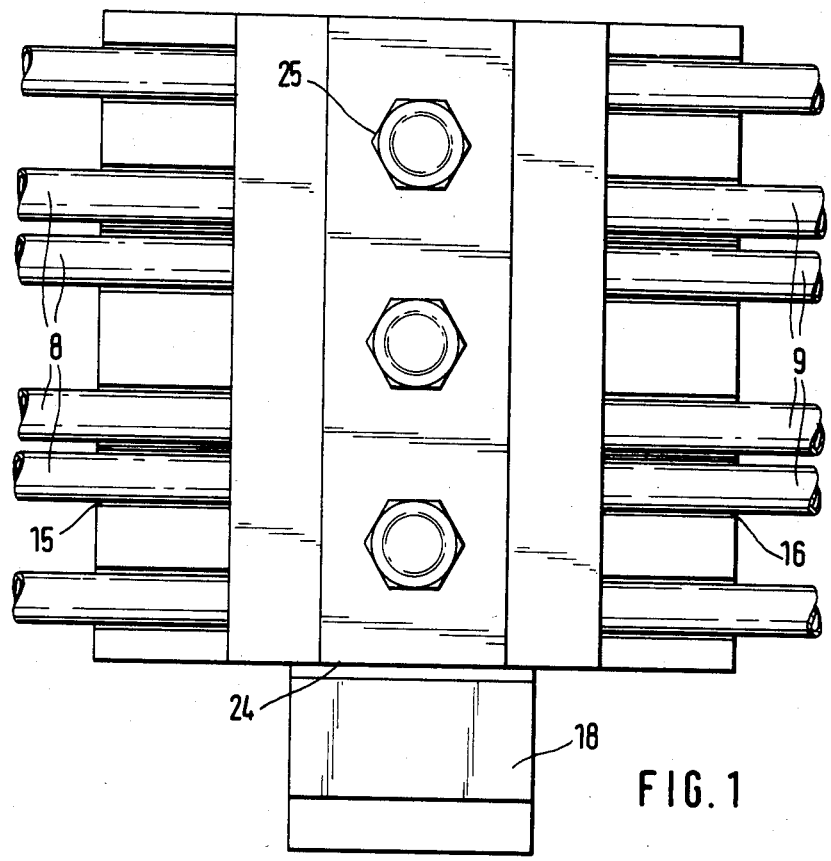
FIG. 1 is a plan view of the arrangement for interconnecting conduits according to the invention.
Figure 2:
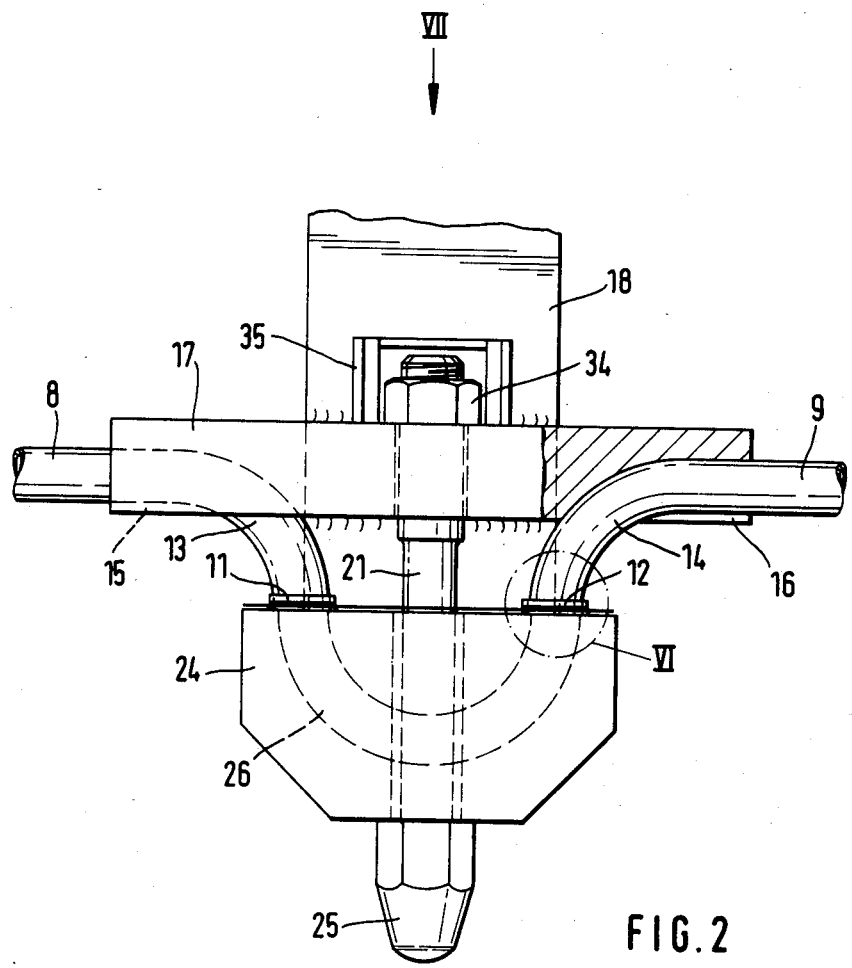
FIG. 2 is a front elevation view of the arrangement of FIG. 1.
Figure 3:
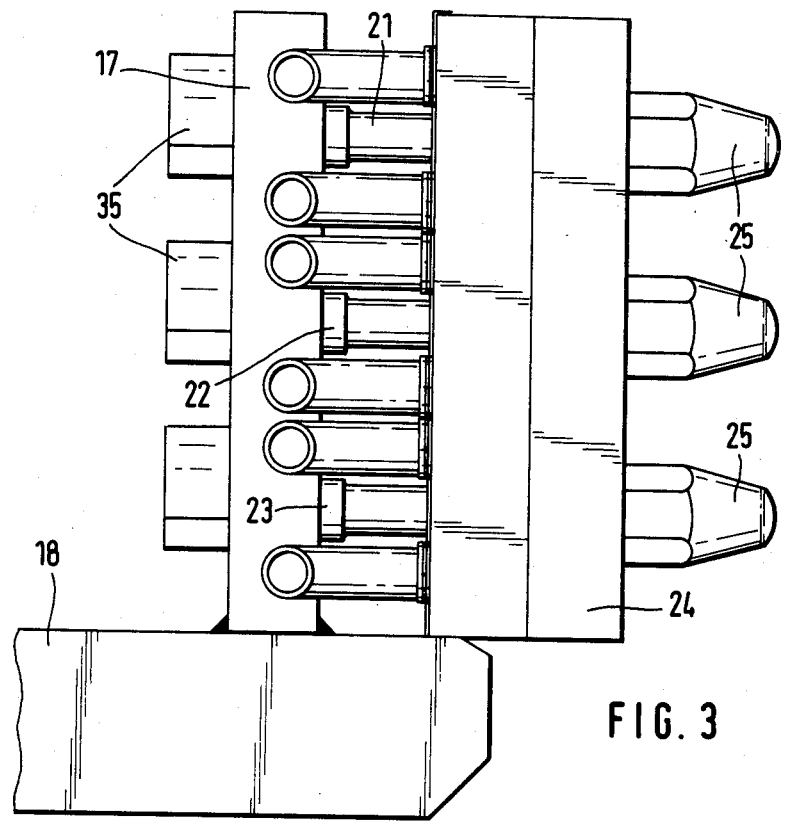
FIG. 3 is a side elevation view of the arrangement of FIG. 1.

Referring to FIGS. 1 to 3, two sets of conduits 8 and 9 extend laterally and outwardly from respective mutually adjacent racks (not shown) containing process equipment used in the hot cell of a nuclear facility. The conduits 8 and 9 have respective conduit end portions 13 and 14 which are curved in the same manner whereby a ninety degree angle is defined. The openings or open terminations 11 and 12 of the conduit end portions 13 and 14 are thereby disposed next to each other so that respective conduit axes are mutually parallel at the open terminations. The two sets of conduit end portions are so arranged that a space is defined therebetween so that there is sufficient space to move an entire rack completely loaded away from a stationary neighboring rack.

The pluralities of conduit end portions 13 and 14 lie in respective pluralities of slots 15 and 16 of a base plate 17 which is welded to a support piece 18 fixedly mounted on the wall of the hot cell. The base plate 17 and support piece 18 conjointly define a fixed supporting bracket 17, 18 for the arrangement for interconnecting conduits of the invention. Three tension bolts 21, 22 and 23 are fastened to the plate 17. The bolts 21 to 23 are arranged centrally between the mutually adjacent sets 13 and 14 of conduit end portions.

A block 24 has through bores corresponding to respective ones of the bolts 21 to 23 and is placed on the bolts so that the latter penetrate the through bores. The heads 25 of the bolts 21 to 23 lie against the block 24 and act to hold the block 24 against the fixed supporting bracket 17, 18 when the bolts are tightened.

Figure 6:
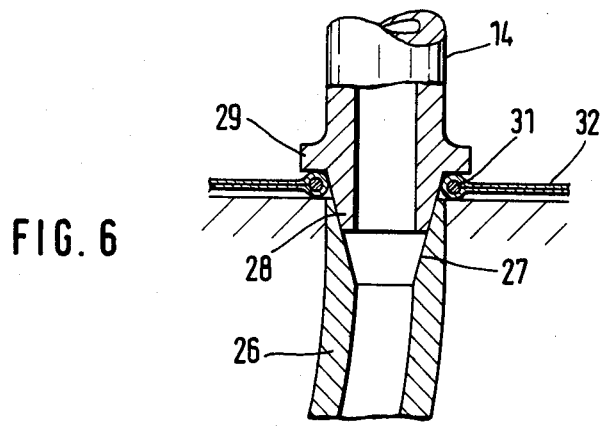
FIG. 6 is an enlarged view of a portion of FIG. 2 showing the connection between a curved conduit end portion and conduit segment in the block.

Six curved conduit segments 26 are arranged parallel one to the other in the block 24 according to a predetermined pattern. The conduit segments 26 are cast into the block when the latter is made. The openings or open terminations of the conduit segments 26 face toward the open terminations of the conduit end portions 13, 14 and are provided with a conical inner wall tapered so as to widen toward the opening as shown in FIG. 6. The curved conduit end portions 13, 14 have a tapered outer cone 28 which fits into and engages the open termination of the conduit segment 26. The outer cone 28 extends into a flange-like shoulder 29 which is suitable for pressing against a sealing ring 31 that is placed on the block 24 around the conduit segment opening. The sealing ring 31 seals the conduit joint.

Referring to FIGS. 4 and 5, the sealing rings 31 for sealing the conduit joints between the conduit segments 26 of the block 24 and the conduit end portions 13, 14 are integrated into sealing plate means in the form of a sealing plate 32 which is exchangeable as a unitary part. The sealing plate 32 comprises a deformable metal plate-like casing which encases the elastic rings 31. A transporting handle 33 is provided at the upper side of the plate-like casing 32 and is utilized in manipulating the casing 32 with remotely-controlled apparatus.

The tension bolts 21 to 23 extend with their threaded portions through respective bores in the base plate 17. Nuts 34 threadably engage the bolts 21 to 23 and are held against rotation by pockets 35 formed on the rear wall of the base plate 17.

Figure 7:
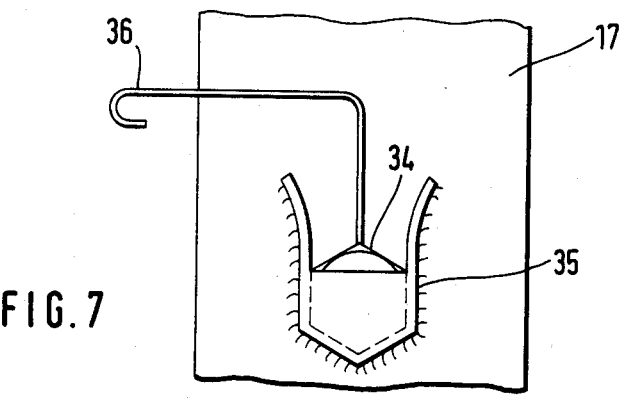
FIG. 7 is a plan view of a portion of the base plate showing a nut of one of the tension bolts arranged in a pocket to prevent rotation of the nut when the bolt is tightened.

Referring to FIG. 7, each nut 34 has a rod-like member 36 attached thereto to facilitate handling by remotely-controlled apparatus.

When the racks for holding the process components are assembled, the fixed supporting bracket 17, 18 is arranged between each two mutually adjacent racks. The curved conduit end portions 13, 14 are arranged in the slots 15, 16 of the base plate 17 of bracket 17, 18. The curved conduit end portions extend away from the plate 17. The connecting block 24 is held by tension bolts 21 to 23 which are connected to the fixed supporting bracket 17, 18. The block 24 is held tightly against the conduit end portions 13, 14 by rotating the heads 25 of the tension bolts. The open terminations of the conduit segments 26 and the open terminations of the conduit end portions 13, 14 are connected to each other with the elastic sealing rings 31 sandwiched therebetween. When the bolts 21 to 23 are tightened further, conduit segments 26 are tightly joined to the conduit end portions 13, 14 and the connections therebetween tightly sealed.

It is understood that the foregoing description is that of the preferred embodiments of the invention and that various changes and modifications may be made thereto without departing from the spirit and scope of the invention, as defined in the appended claims.

What is claimed is:

1. In a hot cell of a nuclear facility for reprocessing irradiated nuclear fuels, the hot cell containing at least two exchangeable racks for accommodating process equipment, the racks being mutually adjacent and positioned against a wall of the hot cell, an arrangement for interconnecting a first plurality of conduits extending outwardly from one of the racks with a second plurality of conduits extending outwardly from the other one of the racks, the arrangement comprising:

a supporting bracket fixedly connected to the wall of the hot cell and having receiving means for receiving the respective conduit end portions of said first plurality of conduits and the respective conduit end portions of said second plurality of conduits;

the first and second pluralities of conduit end portions being bent away from the support bracket ninety degrees so as to cause the open terminations of the first plurality of conduits to be adjacent to and spaced from corresponding ones of the open terminations of the second plurality of conduits and so as to cause the conduit axes of said conduits at said open terminations to be parallel to each other;

a block having a plurality of mutually parallel U-shaped conduit segments contained therein, the open terminations of each of said conduit segments being spaced apart so as to cause said conduit segments to connect respective ones of said first plurality of conduit end portions with corresponding ones of said second plurality of conduit end portions when said block is placed in a predetermined position with respect to said fixed supporting bracket; and, threaded fastener means for tightly holding said block to said supporting bracket in said predetermined position.

2. An arrangement for interconnecting a first plurality of conduits with a second plurality of conduits such as conduits of the kind utilized in nuclear facilities, the arrangement comprising:

a fixed supporting bracket having receiving means for receiving the respective conduit end portions of said first plurality of conduits and the respective conduit end portions of said second plurality of conduits;

the first and second pluralities of conduit end portions being bent away from the support bracket ninety degrees so as to cause the open terminations of the first plurality of conduits to be adjacent to and spaced from corresponding ones of the open terminations of the second plurality of conduits and so as to cause the conduit axes of said conduits at said open terminations to be parallel to each other;

a block having a plurality of mutually parallel U-shaped conduit segments contained therein, the open terminations of each of said conduit segments being spaced apart so as to cause said conduit segments to connect respective ones of said first plurality of conduit end portions with corresponding ones of said second plurality of conduit end portions when said block is placed in a predetermined position with respect to said fixed supporting bracket, said block further having a plurality of bores formed therein; and, holding means for tightly holding said block to said supporting bracket in said predetermined position, said holding means being a plurality of tension bolts extending through corresponding ones of said bores and being connected to said bracket, the heads of said bolts lying against said block to hold the same tightly to said bracket in said predetermined position.

3. The arrangement of claim 2, said fixed support bracket having a plurality of bores formed therein so as to be axially aligned with corresponding ones of said bores in said block when said block is in said predetermined position; said plurality of bolts also extending through corresponding ones of said bores in said bracket; a plurality of nuts threadably engaged by respective ones of said bolts at the far side of said bracket; and means for preventing the rotation of said nuts when said bolts are tightened.

4. The arrangement of claim 3, said rotation prevention means being a plurality of nut pockets corresponding to respective ones of said plurality of nuts and being formed on said bracket; each of said nuts having a rod-like member attached thereto for facilitating the handling of said nuts with remotely-controlled apparatus.

5. The arrangement of claim 2, said bracket including: a base plate, said receiving means being a first plurality of slots for accommodating respective ones of said first plurality of conduit end portions and being a second plurality of slots for accommodating respective ones of said second plurality of conduit end portions.

6. The arrangement of claim 2, said bolts and said conduit segments being arranged in a predetermined pattern.

7. The arrangement of claim 2, said block having a surface whereat said open terminations of said conduit segments communicate with said open terminations of said first and said second pluralities of conduit end portions; and surface sealing means for providing a plurality of elastic sealing rings arranged in a predetermined pattern corresponding to respective ones of said open terminations of said conduit segments, said sealing rings defining respective openings in said sealing means corresponding to the open terminations of said conduit segments.

8. The arrangement of claim 7, said surface sealing means including a flat casing made of deformable metal for encasing and holding said elastic sealing rings.

9. The arrangement of claim 8, said flat casing having a transporting handle formed thereon to facilitate handling thereof by remotely-controlled apparatus.

10. An arrangement for interconnecting a first plurality of conduits with a second plurality of conduits such as conduits of the kind contained in nuclear facilities, the conduits all having axes lying in a common plane, the arrangement comprising:

a fixed supporting bracket having receiving means for receiving the respective conduit end portions of said first plurality of conduits and the respective conduit end portions of said second plurality of conduits;

said first plurality of conduit end portions being bent away from the supporting bracket and said common plane so as to cause the open terminations of said first plurality of conduit end portions to terminate in a first row in another plane parallel to said common plane, said second plurality of conduit end portions likewise being bent away from said support bracket and said common plane so as to cause the open terminations of said second plurality of conduit end portions to terminate in a second row in said other plane, said rows being mutually adjacent so as to cause each open termination of said first plurality of conduits to be adjacent a corresponding open termination of said second plurality of conduits;

a block having a flat surface and a plurality of mutually parallel U-shaped conduit segments contained therein, the open terminations of each of said conduit segments terminating in said flat surface and being positioned vis-a-vis said open terminations of said conduit end portions so as to cause said conduit segments to connect respective ones of said first plurality of conduits with corresponding ones of said second plurality of conduits when said block is placed in a predetermined position with respect to said fixed supporting bracket;

a single flat casing having a plurality of elastic seals encased therein, said casing being arranged in said other plane for providing one of said elastic seals at each location whereat said conduit segments communicate with said conduits thereby sealing the conduit connections; and holding means for tightly holding said block to said supporting bracket in said predetermined position.

* * * * *